United States Patent
Fischaber et al.

(10) Patent No.: US 8,504,745 B1
(45) Date of Patent: Aug. 6, 2013

(54) METHOD OF AND CIRCUIT FOR DETERMINING A SHIFT PATTERN TO GENERATE AN OUTPUT DATA STREAM

(75) Inventors: Curtis L. Fischaber, Firestone, CO (US); Shaun R. Grosser, Erie, CO (US)

(73) Assignee: Xilinx, Inc., San Jose, CA (US)

( * ) Notice: Subject to any disclaimer, the term of this patent is extended or adjusted under 35 U.S.C. 154(b) by 272 days.

(21) Appl. No.: 12/417,366

(22) Filed: Apr. 2, 2009

(51) Int. Cl.
- *G06F 5/00* (2006.01)
- *G06F 13/00* (2006.01)
- *G06F 13/12* (2006.01)

(52) U.S. Cl.
USPC .............................................. 710/66; 710/65

(58) Field of Classification Search
None
See application file for complete search history.

(56) References Cited

U.S. PATENT DOCUMENTS

| | | |
|---|---|---|
| 6,414,609 B1 | 7/2002 | Zukawa et al. |
| 6,742,063 B1 | 5/2004 | Hellum et al. |
| 6,848,042 B1 | 1/2005 | Campbell et al. |
| 2006/0031610 A1 | 2/2006 | Liav et al. |
| 2006/0060042 A1 | 3/2006 | Gosis et al. |
| 2006/0155898 A1 | 7/2006 | Fujisawa |
| 2006/0236004 A1 | 10/2006 | Yang et al. |

*Primary Examiner* — Tanh Nguyen
(74) *Attorney, Agent, or Firm* — John J. King (57) ABSTRACT

A method of determining a shift pattern for generating an output data stream comprising output data words having a data width N from input data words having a data width M is disclosed. The method comprises receiving an input data stream comprising words having the data width M; determining a ratio based upon the data width N and the data width M; determining an initial shift value; generating subsequent shift values of the shift pattern based upon the initial shift value and the ratio based upon the data width N and the data width M, and transforming the input data stream to the output data stream by shifting input data words of the input data stream according to the shift pattern using a barrel shifter or a multiplexer network. A circuit for generating an output data stream comprising output data words having a width N from input data words having a width M is also disclosed.

13 Claims, 5 Drawing Sheets

| Pipe Line Stage 3 Bits [4:0] 15/14/13/12/11 | | | A[6:2] | A[1:0] / B[6:4] | B[3:0] / C[6] | C[5:1] | C[0] / D[6:3] | D[2:0] / E[6:5] | E[4:0] |
|---|---|---|---|---|---|---|---|---|---|
| Pipe Line Stage 2 Bits [4:0] 10/9/8/7/6 | | A[6:2] | A[1:0] / B[6:4] | B[3:0] / C[6] | C[5:1] | C[6] / D[6:3] | D[2:0] / E[6:5] | E[4:0] | F[6:2] |
| Pipe Line Stage 1 Bits [4:0] 5/4/3/2/1 | A[6:2] | A[1:0] / B[6:4] | B[3:0] / C[6] | C[5:1] | C[0] / D[6:3] | D[2:0] / E[6:5] | E[4:0] | F[6:2] | F[1:0] / G[6:4] |
| Shift Amount | | 3 | 1 | -1 | 4 | 2 | 0 | -2 | 3 |
| Comment | Start, data not valid | Valid Data A | Valid Data B | No valid output | Valid Data C | Valid Data D | Valid Data E | No valid output | Valid Data F |

FIG. 6

| Pipe Line Stage 2 Bits [4:0] 14/13/12/11/10/9/8 | | A[4:0] | B[2:0] / B[4:3] | C[0] / C[4:1] / D[4:0] / E[4] | E[3:0] / F[4:2] | F[1:0] / G[4:0] | H[4:0] / I[4:3] |
|---|---|---|---|---|---|---|---|
| Pipe Line Stage 1 Bits [4:0] 7/6/5/4/3/2/1 | A[4:0] / B[4:3] | B[2:0] / C[4:1] | C[0] / D[4:0] / E[4] | E[3:0] / F[4:2] | F[1:0] / G[4:0] | H[4:0] / I[4:3] | I[2:0] / J[4:1] |
| Shift Amount | 2 | 4 | 6 | 8,3 | 5 | 7,2 | 4 |
| Comment | Valid Data A | Valid Data B | Valid Data C | Valid Data D,E Stall Input | Valid Data F | Valid Data G,H Stall Input | Valid Data I |

METHOD OF AND CIRCUIT FOR DETERMINING A SHIFT PATTERN TO GENERATE AN OUTPUT DATA STREAM

FIELD OF THE INVENTION

The present invention relates generally to integrated circuit devices, and in particular, to a method of and circuit for determining a shift pattern to generate an output data stream.

BACKGROUND OF THE INVENTION

In digital design, it may be necessary to convert data from a source input bus of 'M' bits to a destination output bus of 'N' bits, where M and N are of arbitrary widths. In many cases, the arbitrary widths may not be related. That is, the output width may not be a multiple of the input width. Methods for processing data generally involve buffering a multiple of M-bits of data in order to obtain N bits which is greater than M bits of data, and then use a technique to select the appropriate output data. The output data may be multiplexed to properly select the correct output data bits. Control logic is required to generate the data selection, such as through a state-machine using the lowest common denominator, a lookup-table based implementation. However, such conventional methods only address a single conversion, and each design must be re-analyzed for each new M and N value. Further, such conventional methods may not be optimal for devices having certain architectures, such as devices having programmable logic.

SUMMARY OF THE INVENTION

A method of determining a shift pattern for generating an output data stream comprising output data words having a data width N from input data words having a data width M is disclosed. The method comprises receiving an input data stream comprising words having the data width M; determining a ratio based upon the data width N and the data width M; determining an initial shift value; and generating subsequent shift values of the shift pattern based upon the initial shift value and the ratio based upon the data width N and the data width M. The method may comprise determining an initial shift value by determining a value of (y*M)−N, where y is the ceiling of N/M. Generating subsequent shift values of a shift pattern based upon the initial shift value may comprise generating a new shift value according to a first equation if M>N and according to a second equation if M<N. The method may further comprise halting the output data stream when no valid output data is available and halting the input data stream if multiple data words are available to be generated as output data words.

According to an alternate embodiment, a method of determining a shift pattern for generating an output data stream comprising output data words having a data width N from input data words having a data width M comprises receiving the data width M of input data words and data width N of the output data words, determining a ratio of the data width N to the data width M; generating shift values of the shift pattern based upon the ratio of the data width N to the data width M; receiving an input data stream comprising words having the data width M; and generating the output data stream comprising data words having the data width N by shifting the input data words of the input data stream using a barrel shifter operating with the shift pattern. The method may further comprise determining the number of registers required to provide data to the barrel shifter based upon a value of y, where y is equal to the ceiling of N/M. Determining the number of registers comprises selecting either y or (y+1) registers. The method may further comprise determining an initial shift value by determining a value of (y*M)−N, where y is the ceiling of N/M. Generating shift values of a shift pattern comprises generating shift values according to a first equation if M>N and generating shift values according to a second equation if M>N. The method may further comprise halting the output data stream when no valid output data is available when M<N. In addition, the method may further comprise halting the input data stream if multiple data words are available to be generated as output data words when M>N.

A circuit for generating an output data stream comprising output data words having a data width N from input data words having a data width M is also disclosed. The circuit comprises a memory for receiving an input data stream comprising a plurality of data words having the data width M; a plurality of pipeline stages coupled to an output of the memory, each pipeline stage storing words having the width M; a control circuit coupled to receive the values of the data width M and the data width N, the control circuit generating a shift pattern based upon the values of the data width M and the data width N; and a barrel shifter coupled to outputs of the pipeline stages and the control circuit, the barrel shifter shifting data received from the pipeline stages by a value of the shift pattern generated by the control circuit. The pipeline stages may comprise shift registers, wherein the number of pipeline stages comprises a number based upon the ratio of N/M. The number of register may comprise a value of either y or (y+1) registers, where y is equal to the ceiling of N/M. The circuit may further comprise a memory for receiving an input data stream comprising a plurality of data words having the data width M. The control circuit may comprise a processor of a programmable logic device.

DETAILED DESCRIPTION OF THE DRAWINGS

Figure 1:
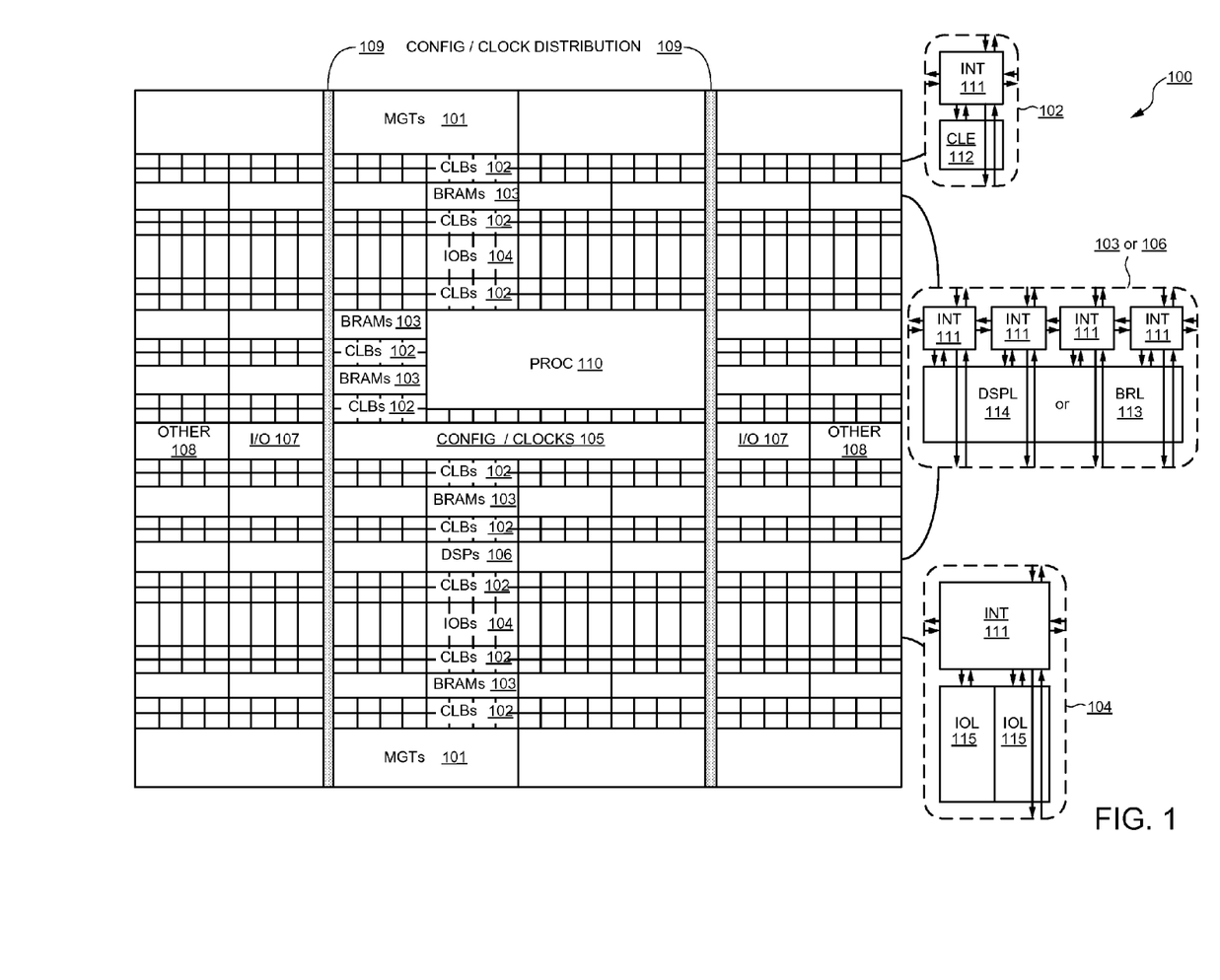
FIG. 1 is a block diagram of a device having programmable logic according to an embodiment the present invention.

Turning first to FIG. 1, a block diagram of a device having configurable logic according to an embodiment the present invention is shown. While devices having programmable logic may be implemented in any type of integrated circuit device, such as an application specific integrated circuit (ASIC) having programmable logic, other devices comprise dedicated programmable logic devices. A programmable logic device (PLD) is an integrated circuit device designed to be user-programmable so that users may implement logic designs of their choices. One type of PLD is the Complex Programmable Logic Device (CPLD). A CPLD includes two or more "function blocks" connected together and to input/output (I/O) resources by an interconnect switch matrix. Each function block of the CPLD includes a two-level AND/OR structure similar to that used in a Programmable Logic Array (PLA) or a Programmable Array Logic (PAL) device. Another type of PLD is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. These CLBs, IOBs, and programmable routing resources are customized by loading a configuration bitstream, typically from off-chip memory, into configuration memory cells of the FPGA. For both of these types of programmable logic devices, the functionality of the device is controlled by configuration data bits of a configuration bitstream provided to the device for that purpose. The configuration data bits may be stored in volatile memory (e.g., static memory cells, as in FPGAs and some CPLDs), in non-volatile memory (e.g., flash memory, as in some CPLDs), or in any other type of memory cell.

The device of FIG. 1 comprises an FPGA architecture 100 having a large number of different programmable tiles including multi-gigabit transceivers (MGTs) 101, configurable logic blocks (CLBs) 102, random access memory blocks (BRAMs) 103, input/output blocks (IOBs) 104, configuration and clocking logic (CONFIG/CLOCKS) 105, digital signal processing blocks (DSPs) 106, specialized input/output blocks (I/O) 107 (e.g., configuration ports and clock ports), and other programmable logic 108 such as digital clock managers, analog-to-digital converters, system monitoring logic, and so forth. Some FPGAs also include dedicated processor blocks (PROC) 110.

In some FPGAs, each programmable tile includes a programmable interconnect element (INT) 111 having standardized connections to and from a corresponding interconnect element in each adjacent tile. Therefore, the programmable interconnect elements taken together implement the programmable interconnect structure for the illustrated FPGA. The programmable interconnect element (INT) 111 also includes the connections to and from the programmable logic element within the same tile, as shown by the examples included at the top of FIG. 1.

For example, a CLB 102 may include a configurable logic element (CLE) 112 that may be programmed to implement user logic plus a single programmable interconnect element (INT) 111. A BRAM 103 may include a BRAM logic element (BRL) 113 in addition to one or more programmable interconnect elements. The BRAM comprises dedicated memory separate from the distributed RAM of a configuration logic block. Typically, the number of interconnect elements included in a tile depends on the height of the tile. In the pictured embodiment, a BRAM tile has the same height as four CLBs, but other numbers (e.g., five) may also be used. A DSP tile 106 may include a DSP logic element (DSPL) 114 in addition to an appropriate number of programmable interconnect elements. An 10B 104 may include, for example, two instances of an input/output logic element (IOL) 115 in addition to one instance of the programmable interconnect element (INT) 111. The location of connections of the device is controlled by configuration data bits of a configuration bitstream provided to the device for that purpose. The programmable interconnects, in response to bits of a configuration bitstream, enable connections comprising interconnect lines to be used to couple the various signals to the circuits implemented in programmable logic, or other circuits such as BRAMs or the processor.

In the pictured embodiment, a columnar area near the center of the die (shown shaded in FIG. 1) is used for configuration, clock, and other control logic. Horizontal areas 109 extending from this column are used to distribute the clocks and configuration signals across the breadth of the FPGA. Some FPGAs utilizing the architecture illustrated in FIG. 1 include additional logic blocks that disrupt the regular columnar structure making up a large part of the FPGA. The additional logic blocks may be programmable blocks and/or dedicated logic. For example, the processor block PROC 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic. The circuits and methods of the present invention may be implemented in the PLD of FIG. 1, or in any other suitable device or devices, including any type of integrated circuit having programmable logic.

Figure 2:
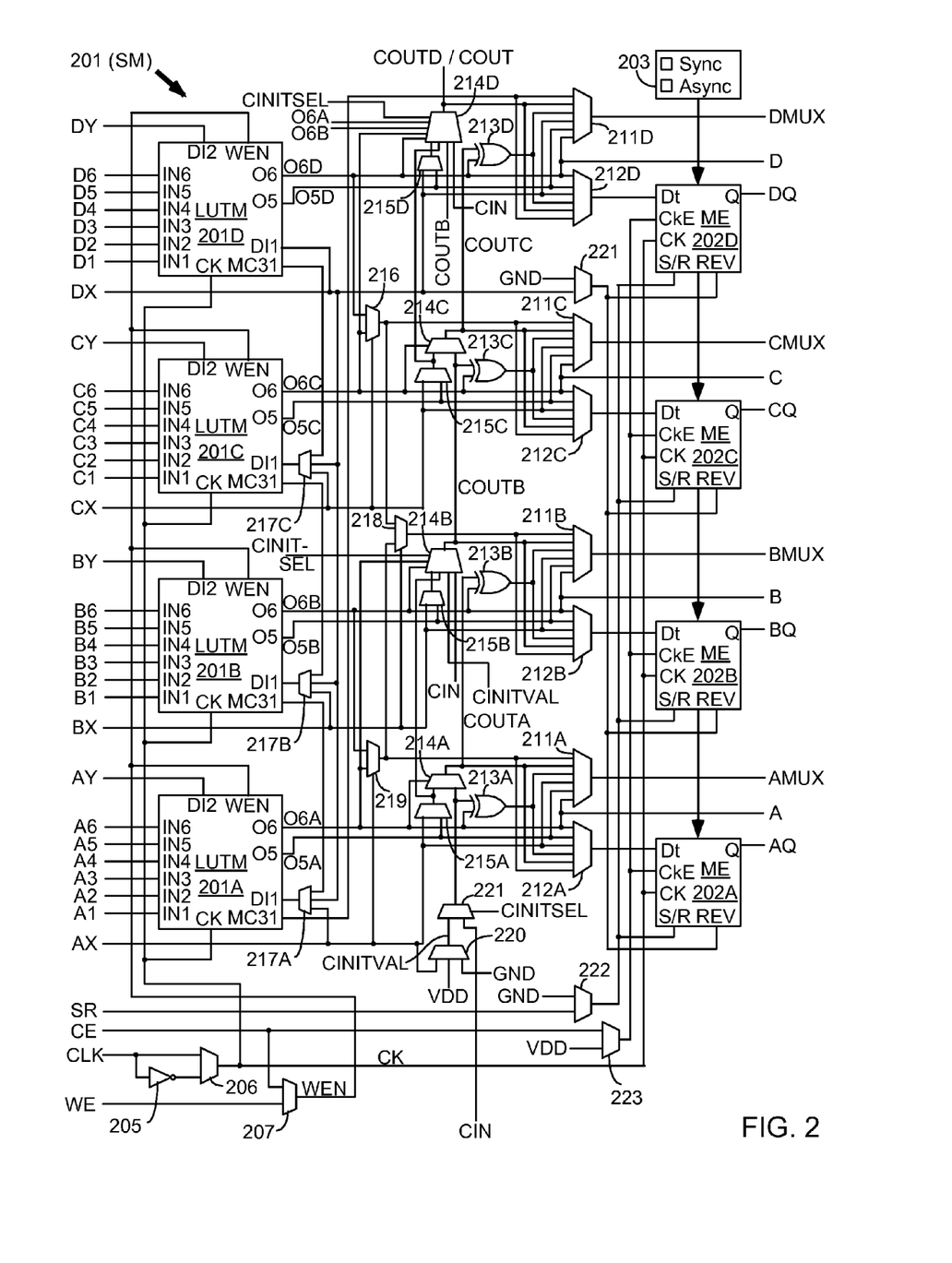
FIG. 2 is a configurable logic element of the device of FIG. 1 according to an embodiment of the present invention.

Turning now to FIG. 2, a block diagram of a configurable logic element of the device of FIG. 1 according to an embodiment of the present invention is shown. In particular, FIG. 2 illustrates in simplified form a configurable logic element of a configuration logic block 102 of FIG. 1. In the embodiment of FIG. 2, slice M 201 includes four lookup tables (LUTMs) 201A-201D, each driven by six LUT data input terminals A1-A6, B1-B6, C1-C6, and D1-D6 and each providing two LUT output signals O5 and O6. The O6 output terminals from LUTs 201A-201D drive slice output terminals A-D, respectively. The LUT data input signals are supplied by the FPGA interconnect structure via input multiplexers, which may be implemented by programmable interconnect element 211, and the LUT output signals are also supplied to the interconnect structure. Slice M also includes: output select multiplexers 211A-211D driving output terminals AMUX-DMUX; multiplexers 212A-212D driving the data input terminals of memory elements 202A-202D; combinational multiplexers 216, 218, and 219; bounce multiplexer circuits 222-223; a circuit represented by inverter 205 and multiplexer 206 (which together provide an optional inversion on the input clock path); and carry logic comprising multiplexers 214A-214D, 215A-215D, 220-221 and exclusive OR gates 213A-213D. All of these elements are coupled together as shown in FIG. 2. Where select inputs are not shown for the multiplexers illustrated in FIG. 2, the select inputs are controlled by configuration memory cells. That is, configuration bits of the configuration bitstream stored in configuration memory cells are coupled to the select inputs of the multiplexers to select the correct inputs to the multiplexers. These configuration memory cells, which are well known, are omitted from FIG. 2 for clarity, as well as from other selected figures herein.

In the pictured embodiment, each memory element 202A-202D may be programmed to function as a synchronous or asynchronous flip-flop or latch. The selection between synchronous and asynchronous functionality is made for all four memory elements in a slice by programming Sync/Asynch selection circuit 203. When a memory element is programmed so that the S/R (set/reset) input signal provides a set function, the REV input terminal provides the reset function. When the memory element is programmed so that the S/R input signal provides a reset function, the REV input terminal provides the set function. Memory elements 202A-202D are clocked by a clock signal CK, which may be provided by a global clock network or by the interconnect structure, for example. Such programmable memory elements are well known in the art of FPGA design. Each memory element 202A-202D provides a registered output signal AQ-DQ to the interconnect structure. Because each LUT 201A-201D provides two output signals, O5 and O6, the LUT may be configured to function as two 5-input LUTs with five shared input signals (IN1-IN5), or as one 6-input LUT having input signals IN1-IN6.

In the embodiment of FIG. 2, each LUTM 201A-201D may function in any of several modes. When in lookup table mode, each LUT has six data input signals IN1-IN6 that are supplied by the FPGA interconnect structure via input multiplexers. One of 64 data values is programmably selected from configuration memory cells based on the values of signals IN1-IN6. When in RAM mode, each LUT functions as a single 64-bit RAM or two 32-bit RAMs with shared addressing. The RAM write data is supplied to the 64-bit RAM via input terminal DI1 (via multiplexers 217A-217C for LUTs 201A-201C), or to the two 32-bit RAMs via input terminals DI1 and DI2. RAM write operations in the LUT RAMs are controlled by clock signal CK from multiplexer 206 and by write enable signal WEN from multiplexer 207, which may selectively pass either the clock enable signal CE or the write enable signal WE. In shift register mode, each LUT functions as two 16-bit shift registers, or with the two 16-bit shift registers coupled in series to create a single 32-bit shift register. The shift-in signals are provided via one or both of input terminals DI1 and DI2. The 16-bit and 32-bit shift out signals may be provided through the LUT output terminals, and the 32-bit shift out signal may also be provided more directly via LUT output terminal MC31. The 32-bit shift out signal MC31 of LUT 201A may also be provided to the general interconnect structure for shift register chaining, via output select multiplexer 211D and CLE output terminal DMUX. The devices having programmable logic and methods of the present invention may be implemented according to the device of FIGS. 1 and 2, or in any device, including any type of integrated circuit having programmable logic.

Figure 3:
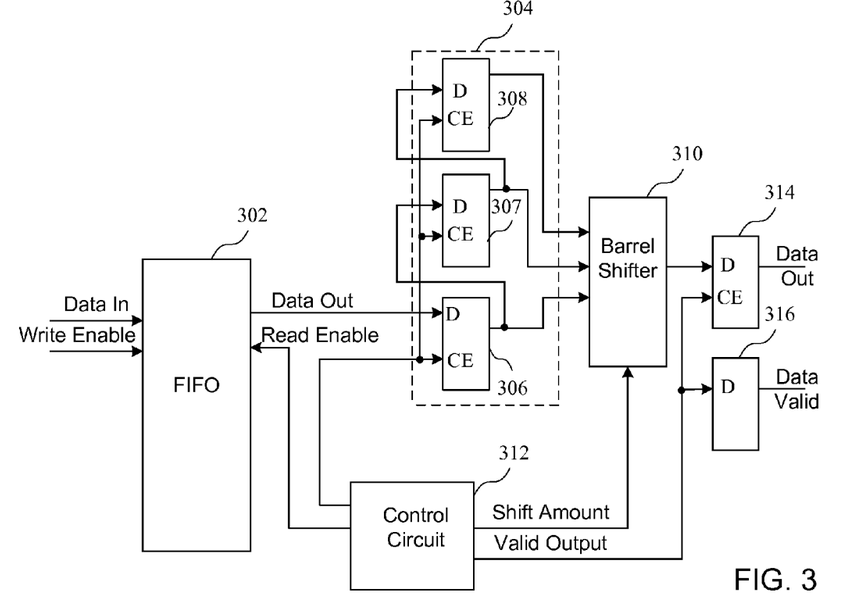
FIG. 3 is a block diagram of a circuit for determining a shift pattern for generating an output data stream according to an embodiment of the present invention.

Turning now to FIG. 3, a block diagram of a circuit for determining a shift pattern for generating an output data stream according to an embodiment of the present invention is shown. The circuit of FIG. 3 provides a parametizable circuit to convert data bus widths from any arbitrary M bit to N bit relationship, even where the ratio of M/N is a non-integer and non-symmetrical relationship. For example, the ratio of M/N may be 9 to 13 bits. A memory 302 is coupled to receive input data (Data In) and a write enable (Write Enable) signal and a read enable (Read Enable) signal. The memory 302 may be, for example, a first-in first-out (FIFO) memory. A data output signal (Data Out) is generated in response to the read enable signal, as will be described in more detail below. The input data is passed through a data width conversion circuit 304 having a plurality of registers comprising a first register 306, a second register 307 and a third register 308, the outputs of which are coupled to a barrel shifter 310.

Figure 4:
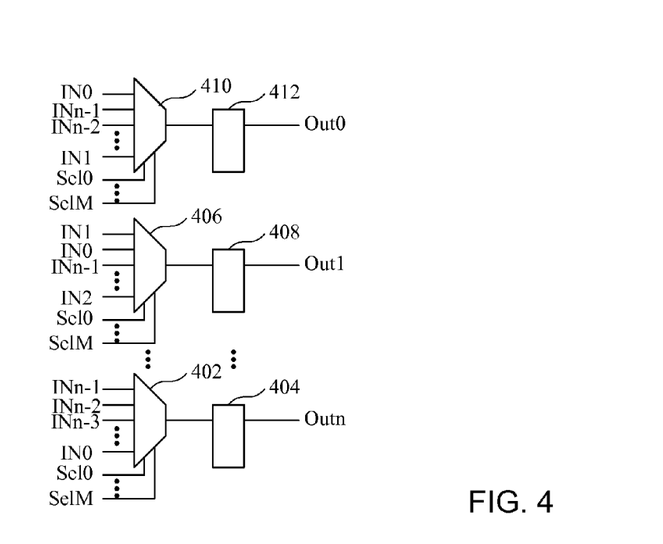
FIG. 4 is a block diagram of the barrel shifter of FIG. 3 according to an embodiment of the present invention.

A barrel shifter is a bit-rotating shift register. The bits shifted out the LSB end of the register are shifted back into the MSB end of the register when data is shifted. In a barrel shifter, the bits are shifted the desired number of bit positions in a single clock cycle. As shown in FIG. 4 for example, an n-bit barrel shifter could shift the data by three positions in a single clock cycle. If the original data was 0100 . . . 0001, one clock cycle later the result will be 0010 . . . 1000. In particular, a first stage comprising a multiplexer 402 and an output register 404 is coupled to receive the data in the input order. Two additional stages comprising a multiplexer 406 and a corresponding register 408 and a multiplexer 410 and a corresponding register 412 is also shown. The data input to the other stages is shifted by one for each stage. For example, the inputs from the bottom to top of the multiplexer 402 are IN0 to INn−1, while the inputs from the bottom to the top of multiplexer 410 are IN1 to IN0 and the inputs from the bottom to the top of multiplexer 406 are IN2 to IN1. Accordingly, the input for the second to last stage comprising multiplexer 406 and output register 408 shifted by n−2 places, while the last stage comprising a multiplexer 410 and output register 412 are shifted by n−1 places as shown. As shown in FIG. 4, any bit can end up in any bit position, and the multiplexers are used to place the bits correctly for proper storage based upon the selection signal Sel0-SelM. While registers are shown at the output of the barrel shifters according to the embodiment of FIG. 4, they are not required.

As the data width expansion is performed by loading data in the registers 306-308, the shift value for the barrel shifter is generated by a control logic circuit 312 as will be described in more detail below. The control circuit 312 may also generate a Valid Output signal which may be coupled to the clock enable of an output register 314 at the output of the barrel shifter and a data valid register 316. The circuit of FIG. 3 places no requirements between M and N ratio, other than if N<M, then the source data must be able to be halted. The result is a very high-speed, small implementation circuit with low latency, which is therefore well suited to FPGA architectures. The circuit of FIG. 3 may be implemented in the devices having programmable logic of FIGS. 1 and 2, where the control circuit may be implemented in the processor 110 or CLEs 112, and the barrel shifter may be implemented in the CLE 112, for example. That is, the multiplexer may be implemented in the CLEs of FIG. 1, where the programmable interconnect elements may be configured to provide the appropriate connections as shown in FIG. 4.

Figure 5:
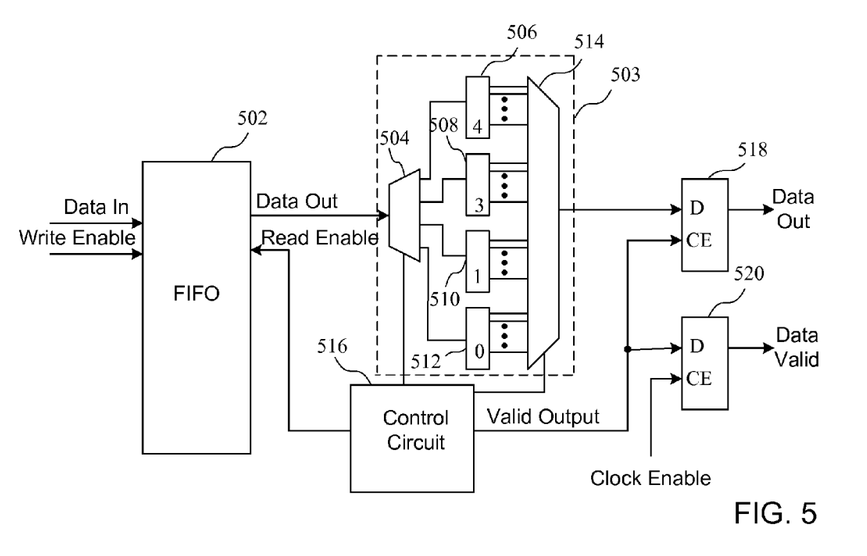
FIG. 5 is a block diagram of a circuit for determining a shift pattern for generating an output data stream according to an alternate embodiment of the present invention.

Turning now to FIG. 5, a block diagram of a circuit for determining a shift pattern for generating an output data stream according to an alternate embodiment of the present invention is shown. A memory 502 is coupled to receive input data and a write enable signal and a read enable signal. The memory 502 may also comprise a FIFO memory. Unlike the embodiment of FIG. 3, the data output signal is coupled to an output mutiplexer network 503. In particular, the Data Output signal is coupled to a demultiplexer 504, the outputs of which are coupled to registers 506-512. An output multiplexer 514 is coupled to each of the registers 506-512. The output multiplexer network is controlled by the control circuit 516. The operation of the control circuit 516 enables selecting the correct output data to be coupled to an output register 518 according to the determined shift pattern, which will be described in more detail below. The control circuit 516 may also generate a Valid Output signal which may be coupled to the clock enable of the output register 518. The circuit of FIG. 5 may also be implemented in the devices having the programmable logic of FIGS. 1 and 2, where output multiplexing may be implemented in the CLE 112, for example, where the lookup tables may function as a multiplexer. While the circuit of FIGS. 3 and 5 will operate according to the same shift pattern, the circuit of FIG. 3 finds particular application in programmable logic devices. That is, the barrel shifter of FIG. 3 may be implemented with fewer multiplexers and is generally more efficient than the output multiplexer of FIG. 5, and is easily implemented in a programmable logic device, such as the device of FIG. 1.

Figure 6:
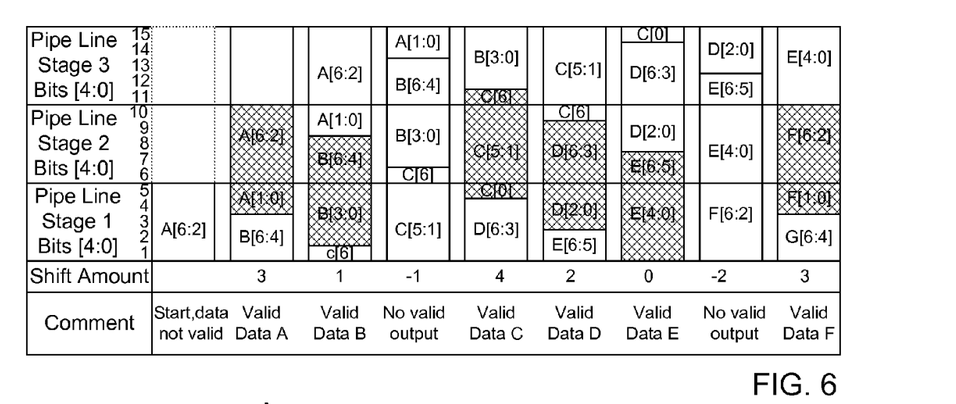
FIG. 6 is a table showing an example of determining a shift pattern for generating an output data stream according to an embodiment of the present invention.
Figure 7:
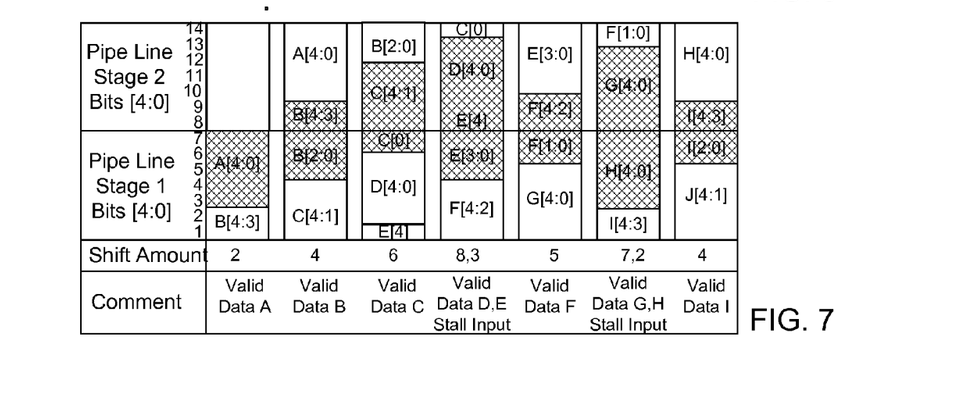
FIG. 7 is a table showing a method of determining a shift pattern for generating an output data stream according to an alternate embodiment of the present invention.

Turning now to FIG. 6, a table shows an example of determining a shift pattern for generating an output data stream according to an embodiment of the present invention. Two examples are provided to demonstrate how the circuit of FIGS. 3 and 5 may be implemented with different values of M and N. The table of FIG. 6 shows the case where M is greater than N, while the table of FIG. 7 shows the case where M is less than N. In the example of FIG. 6, M=5 and N=7. The first 5-bit source data is labeled as A[6:2], indicating that these are the first 5-bits of the desired 7-bit output. The second 5-bit source data contains the final two bits (A[1:0]) of the 7-bit output, as well as the first 3-bits of the second output data sample (B[6:4]). Once the full 7-bit value exists, the first output data word may be generated (A[6:0]). This may be implemented in FIG. 3, wherein the input data A[6:2] enters into the first pipeline (i.e. register 306) of the circuit. When the second input sample is provided, the first input sample moves into the second pipeline stage (i.e. register 307). With the second data input, there are 10-bits of valid data, thus the first 7-bit output data is valid. This is shown in FIG. 6, where the cross-hatched block indicates the valid output data. It should be noted that the data spans across the 2nd stage pipeline and the 1st stage pipeline. The lower N bits of the barrel shifter output, 7-bits in this example, are used as the valid output, and thus the barrel shifter needs to shift by 3, providing Valid Data A output in the appropriate location. While all barrel shift values defined are 'right shifts' according to this example, the circuit could be arranged to provide left shifts.

The next source data sample requires a shift amount of 1 to generate Valid Data B. It should also be noted that there are some cycles were there is not enough data in the pipeline stages to generate a valid output, and therefore are labeled as 'No valid output'. These cycles have a negative shift value indicating that data is not valid for that cycle. These negative values will be used in protocol implemented in the control circuit as will be described in more detail below. As shown in the fourth column of the table, because only 6 bits (i.e. C[6:1]) are available, it is not until the next cycle when C[0] and D[6:3] are loaded into the register 306 that full 7-bit output is available. As can be seen in this case, a shift amount of 4 bits is required by the barrel shifter to output C[6:0]. In the next clock cycle, the remaining 3 bits D[2:0] are coupled to the register 306 along with E[6:5], enabling D[6:0] to be output after a 2 bit shift by the barrel shifter. When the remaining 5 bits of the E[6:0] are entered, the E data may be output without any shift by the barrel shifter. As shown in the following column, only 5 bits of the F data (i.e. F[6:2]) are available. Therefore, no valid data is available until the next clock cycle. That is, after F[1:0] and G[6:4] are loaded into the registers, F[6:0] is available to be output from the barrel shifter which makes a 3-bit shift. As can be seen, the pattern repeats when a shift value of 3 is reached. This gives the shift pattern: 3, 1, −1, 4, 2, 0, −2. Accordingly, once the shift pattern is determined, the shift pattern is continuously applied to the circuits of FIGS. 3 and 5 to generate the M-bit output words. Alternatively, the shift pattern could be continuously generated and then applied. As shown in FIG. 6, three registers are required to store enough data to output 7-bit words when only 5-bit input data words are provided. However, as will be shown in FIG. 7, only two registers will be required when 7-bit input words are provided and 5 bit output words are generated. The method for calculating the number of registers will be described in more detail below.

Turning now to FIG. 7, a table shows an example of determining a shift pattern for generating an output data stream according to an alternate embodiment of the present invention where M=7 and N=5. Because M>N, the source data must be stalled at some point to allow for the rate matching. The same procedure as in the example of FIG. 6 is applied to these new M and N values. In particular, because 7 bits of a first input word are stored in the pipeline registers, data is immediately available to generate a 5-bit output word after a 2-bit shift by the barrel shifter. Accordingly, A[4:0] is available to be output and B[4:3] are already in the register 306 to be output by the barrel register in the next clock cycle. That is, after B[2:0] and C[4:1] are provided to the register 306, valid data B comprising B[4:0] are available to be output after a 4-bit shift by the barrel shifter. In the next clock cycle after D[4:0] and E[4] are loaded into register 306, valid data C comprising C[4:0] is output by the shift register after a 6-bit shift by the barrel shifter. As will be apparent in the next clock cycle, the input data must be stalled when the shift is equal to 7 or 8 because there are multiple valid outputs available. Because both valid D and E words are available, the input is stalled as the barrel shifter outputs two consecutive words by performing an 8-bit shift and then a 3-bit shift. In the next clock cycle, valid data F is available after F[1:0] and G[4:0] are input and a shift of 5 is provided by the barrel shifter. In the next clock cycle, the input data is again stalled, and both valid data G and H are output after shifts by the barrel shifter of 7 and 2 bits. The pattern repeats when a shift value of 2 is reached giving a shift pattern of 2, 4, 6, 8, 3, 5, 7. This procedure may be repeated for any given M to N ratio to generate the required shift values.

According to one aspect of the invention, the shift pattern may be calculated by the control circuit and then applied by one of the circuits of FIG. 3 or 5. The input data is expanded such that its width is greater than the destination data width. By way of example, a value 'z' (equal to the source data width multiplication factor) is calculated according to the equation z=y+a, where 'y'=Ceiling (N/M) and 'a' is an expansion factor which is dependant upon the N/M ratio and the resulting shift values. As will be described in more detail below, 'a' is either equal to '0' or '1'. It should be noted that the ceiling function generates an integer which is the integer value of the ratio rounded up for any non-integer ratio. The data source is operated on by a barrel shifter of size "'z'×N". The start shift for the barrel shifter is determined first, where start=(y*M)−N. It should be noted that if M>N, the first data output will be valid after 'y' input samples. The barrel shifter control logic then generates shift values and therefore the shift pattern. According to one embodiment, the shift value, which is dependant upon the relationship between N and M, may be determined by the following pseudo-code:

if (M<N) then
    if (shift(old)>=0) then
        shift(new)=shift(old)+M−N, (Read Enable=1, Valid Output=1)
    else
        shift(new)=shift(old)+M, (Read Enable=1, Valid Output=0)
    end if
    else//M>=N
    if (shift(old)<M) then
        shift(new)=shift(old)+M−N, (Read Enable=1, Valid Output=1)
    else
        shift(new)=shift(old)−N, (Read Enable=0, Valid Output=1)
    end if
    end if According to the pseudo code set forth above, the shift(old) is the previous shift value, while shift(new) is the current value being calculated. For the second sample (after the start shift of the barrel shifter), shift(old)=start. When shift(new)=start, the pattern completes and will repeat. The required barrel shift pattern is given by {start, shift(new,1), shift(new, 2), . . . } as shown by the examples of FIGS. 6 and 7.

If M<N, a shift(new) may be less than 0 (i.e. a negative shift range) indicating that there is not enough data in the barrel shifter to generate the entire output data. Thus, another input is accepted and the shift is increased by M according to the equation, but no output is generated during a negative shift value. If M>N, a shift(new) may be greater than or equal to M, indicating that there are multiple valid samples in the current barrel shifter. Therefore, the input must be stalled as the multiple valid outputs are extracted. Once the shift is again less than M, the input samples may again be enabled.

After defining the barrel shift values, the value of 'a' may be defined. This is defined as according to the following pseudo code:
  if (M<N) then
    if (max[all shift values]+N>y*M) then
      a=1
    else
      a=0
    end if
  else
    a=1
  end if The max[all shift values] is the maximum value of the shift values defined in the pseudo code for generating a shift value set forth above. According to the example of FIG. 6 where M=5, N=7,
(1) y=2 and z=2+a.
(2) start=2*5−7=3, where it should be noted that the first data output will be valid after 'y' (two) input samples.
(3) shift pattern=3, 1, −1, 4, 2, 0, −2, where the −1 and −2 indicates no valid data and when shift=3, shift=start, thus the pattern repeats.
(4) max[all shift values]=4; 4+7>2*5, thus a=1 and z=3. This means the pipeline and barrel shifter require z*M=3*5=15-bits.

In the example of FIG. 7 where M=7, N=5,
(1) y=1 and z=1+a (2) start=1*7−5=2
(3) shift pattern=2, 4, 6, 8, 3, 5, 7
(4) Because M>N, a=1 and thus z=2. This means the pipeline and barrel shifter requires z*M=2*7=14-bits.
When shift=8 and shift=7, the shift(new) is greater than or equal to M condition is satisfied, and thus there are multiple valid outputs available. The input samples are stalled, but the control logic continues to run, updating the shift(new) value and generating the valid output samples. When shift=2, shift=start, thus the pattern repeats. The parametizable pseudo-code set forth above may be easily implemented in FPGA logic gates.

While specific circuits are set forth above, the various methods could be performed using some other circuit. The implementations of the various embodiments minimize the required resources by limiting the data width expansion to y or y+1. However, this requires additional complexity in calculating the value "a." According to an alternate embodiment, "a" would always be set to 1, and thus z=y+1. While the circuits of FIGS. 3 and 5 use a synchronous FIFO on the input, an asynchronous FIFO could be placed on the input to the circuit if an asynchronous arbitrary data width conversion is required. Further, the input synchronous FIFO is not required, in which case the circuit could directly interface with the data source.

Figure 8:
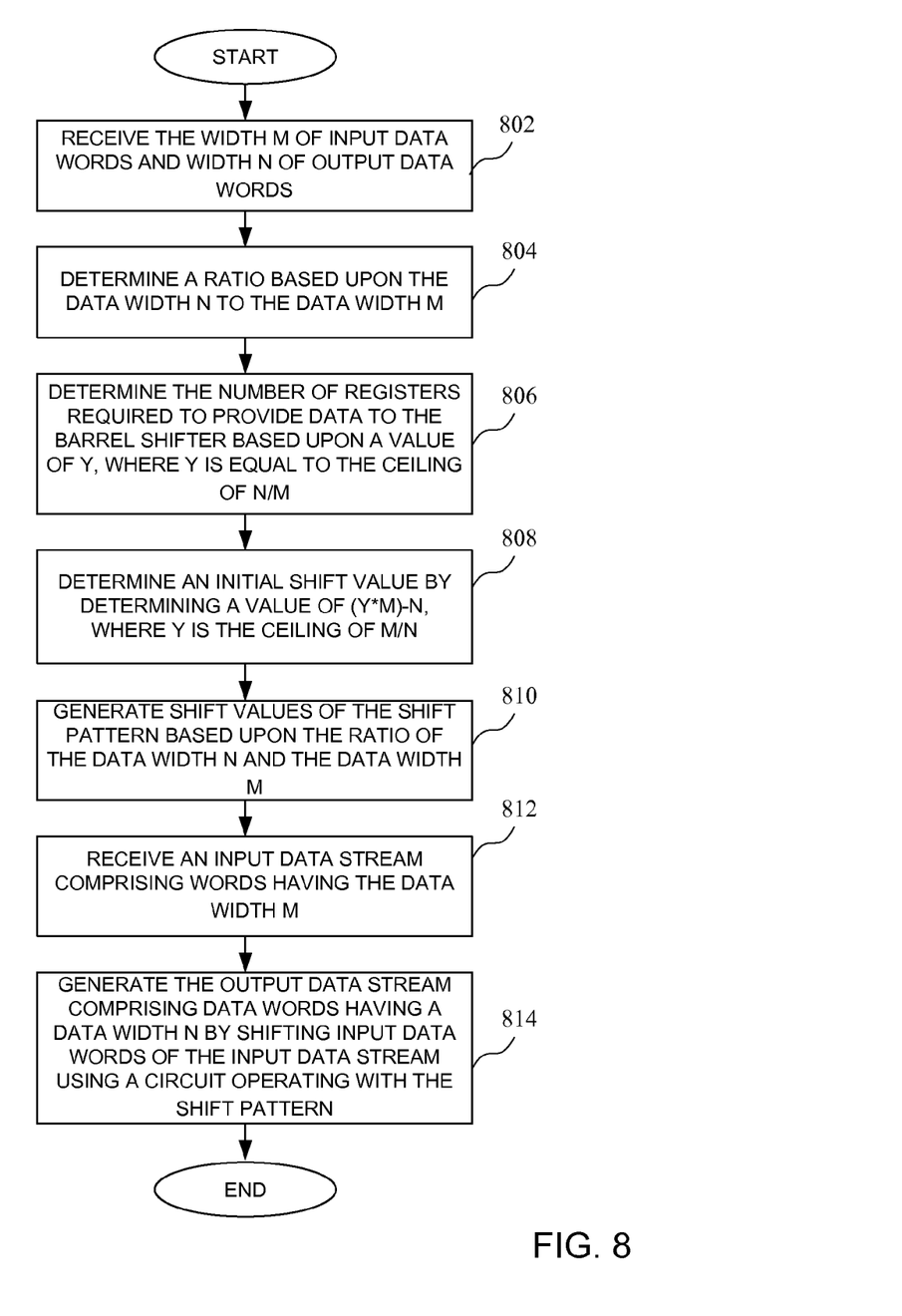
FIG. 8 is a flow chart showing a method of generating a shift pattern for generating an output data stream according to an embodiment of the present invention.

Turning now to FIG. 8, a flow chart shows an example of determining a shift pattern for generating an output data stream according to an embodiment of the present invention. The width M of input data words and width N of output data words are received at a step 802. A ratio is determined based upon a ratio of the data width N to the data width M at a step 804. The number of registers required to provide data to the barrel shifter is determined based upon a value of y, where y is equal to the ceiling of N/M at a step 806. An initial shift value is determined by determining a value of (y*M)−N at a step 808. Shift values of the shift pattern are generated based upon the ratio of the data width N and the data width M at a step 810 until the shift pattern is determined. An input data stream comprising words having the data width M is received at a step 812. The output data stream comprising data words is generated having a data width N by shifting input data words of the input data stream using a circuit operating with the shift pattern at a step 814. The method of FIG. 8 may be implemented using any of the circuits as described above, and particularly the circuits of FIGS. 3-5, or any other suitable circuit.

It can therefore be appreciated that the new and novel circuit and method of determining a shift pattern for generating an output data stream has been described. It will be appreciated by those skilled in the art that numerous alternatives and equivalents will be seen to exist which incorporate the disclosed invention. As a result, the invention is not to be limited by the foregoing embodiments, but only by the following claims.

We claim:

1. A method of determining a shift pattern for generating an output data stream comprising output data words having a data width N from input data words having a data width M, where N is not equal to M, the method comprising:
  receiving an input data stream comprising words having the data width M;
  determining a value of (y*M)−N, where y is the ceiling of N/M;
  determining an initial shift value of the shift pattern using the determined value of (y*M)−N;
  generating subsequent shift values of the shift pattern until the determined initial shift value is generated, wherein each subsequent shift value is based upon an immediate previous shift value of the shift pattern, the data width N, and the data width M, and the shift pattern includes the determined initial shift value followed by subsequent shift values generated before the value of the determined initial shift value is generated;
  coupling a first input word of the input data stream to a first pipeline stage, wherein the first input word has a data width M;
  moving the first input word to a second pipeline stage when a second input word of the input data stream is coupled to the first pipeline stage, wherein the second input word has the data width M;
  coupling outputs of the first pipeline stage and the second pipeline stage to a barrel shifter; and
  transforming the input data stream to the output data stream by shifting input data words of the input data stream in the barrel shifter according to the shift pattern.

2. The method of claim 1 wherein generating subsequent shift values of the shift pattern includes generating a new shift value, if M is greater than or equal to N, equal to an old shift value plus (M−N) if the old shift value is less than M, otherwise generating the new shift value equal to the old shift value minus N, and generating the new shift value, if M is less than N, equal to the old shift value plus (M−N) if the old shift value is greater than or equal to zero, otherwise generating the new shift value equal to an old shift value plus M.

3. The method of claim 1 further comprising halting the output data stream when no valid output data is available, and halting the input data stream if multiple data words are available to be generated as output data words.

4. The method of claim 1 further comprising determining a number of pipeline stages, required to generate the output data stream, wherein the number of pipeline stages is equal to a sum of y and a, where a is equal to 1 if M<N and the sum of the maximum value of the shift values and N is greater than (y*M), where a is equal to 1 if M>N, and where a is equal to 0 if M<N and the sum of the maximum value of the shift values and N is not greater than (y*M).

5. A method of determining a shift pattern for generating an output data stream comprising output data words having a data width N from input data words having a data width M, where N is not equal to M, the method comprising:
    receiving an input data stream comprising words having the data width M;
    determining a value of (y*M)−N, where y is the ceiling of N/M;
    determining an initial shift value of the shift pattern using the determined value of (y*M)−N;
    generating subsequent shift values of the shift pattern, wherein each subsequent shift value is based upon an immediate previous shift value of the shift pattern, the data width N, and the data width M, including generating a new shift value of the subsequent shift values, if M is greater than or equal to N, equal to an old shift value plus (M−N) if the old shift value is less than M, otherwise generating the new shift value equal to the old shift value minus N, and generating the new shift value of the subsequent shift values, if M is less than N, equal to the old shift value plus (M−N) if the old shift value is greater than or equal to zero, otherwise generating the new shift value equal to an old shift value plus M; and
    transforming the input data stream to the output data stream by shifting input data words of the input data stream according to the shift pattern.

6. The method of claim 5 further comprising halting the output data stream when no valid output data is available, and halting the input data stream if multiple data words are available to be generated as output data words.

7. The method of claim 5 further comprising determining a number of pipeline stages, required to generate the output data stream, equal to a sum of y and a, where a is equal to 1 if M<N and the sum of the maximum value of the shift values and N is greater than (y*M), where a is equal to 1 if M>N, and where a is equal to 0 if M<N and the sum of the maximum value of the shift values and N is not greater than (y*M).

8. The method of claim 5 wherein transforming the input data stream to the output data stream comprises generating the output data stream by shifting input data words of the input data stream using a barrel shifter operating with the shift pattern.

9. A circuit for determining a shift pattern for generating an output data stream comprising output data words having a data width N from input data words having a data width M, where N is not equal to M, the circuit comprising:
    a data width conversion circuit configured to receive an input data stream comprising words having the data width M, the data width conversion circuit comprising a first pipeline stage coupled to receive a first input word having the data width M and a second pipeline stage coupled to the first pipeline stage, the second pipeline stage receiving the first input word having the data width M when a second input word having the data width M is received at the first pipeline stage;
    a control circuit, coupled to the data width conversion circuit, configured to determine a value of (y*M)−N, where y is the ceiling of N/M, and to determine an initial shift value of the shift pattern using the determined value of (y*M)−N;
    wherein the control circuit generates subsequent shift values, wherein each subsequent shift value is based upon an immediate previous shift value, the data width N, and the data width M, and the subsequent shift values of the shift pattern are generated until the determined initial shift value is generated, and wherein the shift pattern includes the determined initial shift value followed by subsequent shift values generated before the value of the determined initial shift value is generated; and
    a shift circuit coupled to the control circuit and configured to transform the input data stream to the output data stream by shifting input data words of the input data stream according to the shift pattern.

10. The circuit of claim 9 wherein generating subsequent shift values of the shift pattern includes generating a new shift value, if M is greater than or equal to N, equal to an old shift value plus (M−N) if the old shift value is less than M, otherwise generating the new shift value equal to the old shift value minus N, and by generating the new shift value, if M is less than N, equal to the old shift value plus (M−N) if the old shift value is greater than or equal to zero, otherwise generating the new shift value equal to an old shift value plus M.

11. The circuit of claim 9 wherein the control circuit halts the output data stream when no valid output data is available, and halts the input data stream if multiple data words are available to be generated as output data words.

12. The circuit of claim 9 wherein the control circuit further determines a number of pipeline stages, required to generate the output data stream, equal to a sum of y and a, where a is equal to 1 if M<N and the sum of the maximum value of the shift values and N is greater than (y*M), where a is equal to 1 if M>N, and where a is equal to 0 if M<N and the sum of the maximum value of the shift values and N is not greater than (y*M).

13. The circuit of claim 9 wherein the shift circuit transforms the input data stream to the output data stream by shifting input data words of the input data stream using a barrel shifter operating with the shift pattern.

* * * * *